(No Model.) 7 Sheets—Sheet 3.
R. B. CAMPBELL & H. CARLTON.
CAR CONSTRUCTION.
No. 598,136. Patented Feb. 1, 1898.

Witnesses Inventors.
R.B. Campbell and
Howard Carlton.
by J. E. Stebbins.

(No Model.) 7 Sheets—Sheet 4.
R. B. CAMPBELL & H. CARLTON.
CAR CONSTRUCTION.
No. 598,136. Patented Feb. 1, 1898.

Witnesses:
L. G. Harvey
M. Townshend

Inventors.
R. B. Campbell and
Howard Carlton.
by F. E. Stebbins.

(No Model.) 7 Sheets—Sheet 5.

R. B. CAMPBELL & H. CARLTON.
CAR CONSTRUCTION.

No. 598,136. Patented Feb. 1, 1898.

Witnesses:
L. T. Haney
M. Townshend

Inventors.
R. B. Campbell and
Howard Carlton
by F. E. Stebbins.

(No Model.) 7 Sheets—Sheet 6.
R. B. CAMPBELL & H. CARLTON.
CAR CONSTRUCTION.
No. 598,136. Patented Feb. 1, 1898.
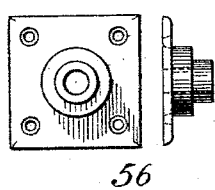
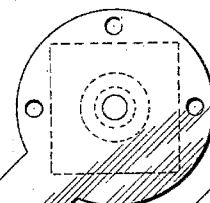
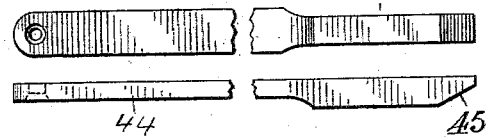
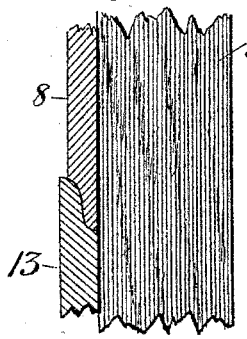
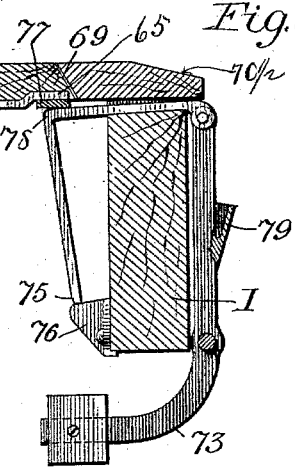
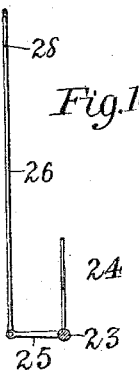
Witnesses:
Inventors.
R. B. Campbell and
Howard Carlton
by F. E. Stebbins (No Model.) 7 Sheets—Sheet 7.
R. B. CAMPBELL & H. CARLTON.
CAR CONSTRUCTION.
No. 598,136. Patented Feb. 1, 1898.
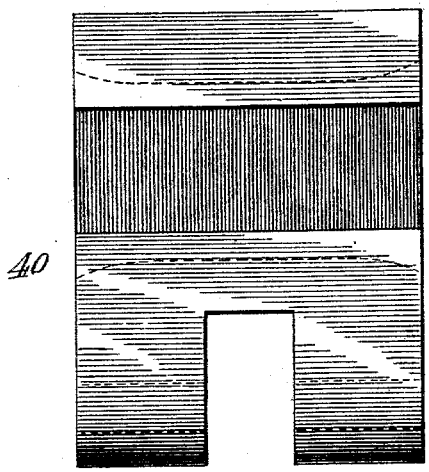
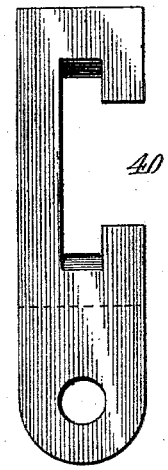
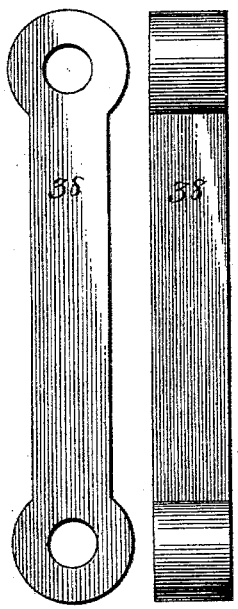
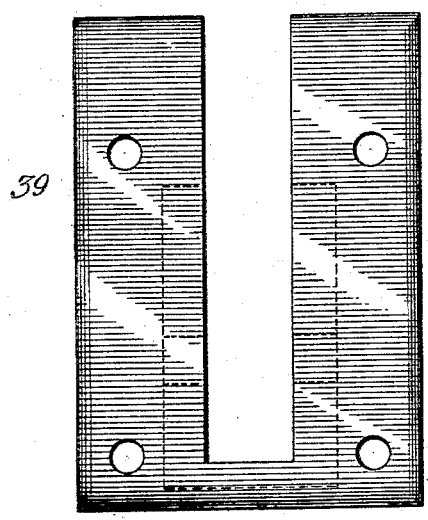
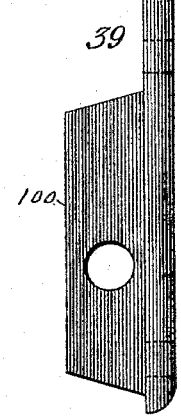
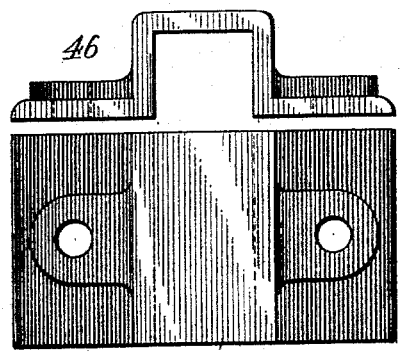
Witnesses:
Inventors.
R. B. Campbell and
Howard Carlton,
by J. E. Stebbins.

UNITED STATES PATENT OFFICE.

ROBERT B. CAMPBELL AND HOWARD CARLTON, OF BALTIMORE, MARYLAND, ASSIGNORS TO THE CAMPBELL & HOUSE COMBINATION FREIGHT AND HUMANE STOCK CAR COMPANY, OF WEST VIRGINIA.

CAR CONSTRUCTION.

SPECIFICATION forming part of Letters Patent No. 598,136, dated February 1, 1898.

Application filed May 18, 1896. Serial No. 592,088. (No model.)

*To all whom it may concern:*

Be it known that we, ROBERT B. CAMPBELL and HOWARD CARLTON, citizens of the United States, residing at Baltimore, State of Maryland, have invented certain new and useful Improvements in Car Construction; and we do declare the following to be a full, clear, and exact description of the invention, such as will enable others skilled in the art to which it appertains to make and use the same, reference being had to the accompanying drawings, and to the figures of reference marked thereon, which form a part of this specification.

The objects of our invention are the production of a car especially adapted for the transportation of different classes of freight—first, which can be transformed into a practically closed and air-tight box-car impervious to dust, cinders, sifting snow, &c.; second, which can be converted into an open ventilated car, and, third, which is provided with movable doors in the floor arranged to open and close and thus constitute a dumping-car.

With these objects in view our invention consists in constructing a car with adjustable sides, movable sections, movable doors, and drop-doors in the floor, all of novel construction and adaptation to attain the objects set forth.

Our invention consists, still further, in certain novelties in details of construction and in combinations of parts hereinafter described, and recited in the claims.

The drawings illustrate one mode we have thus far devised for the practical embodiment of our invention.

Figure 1:
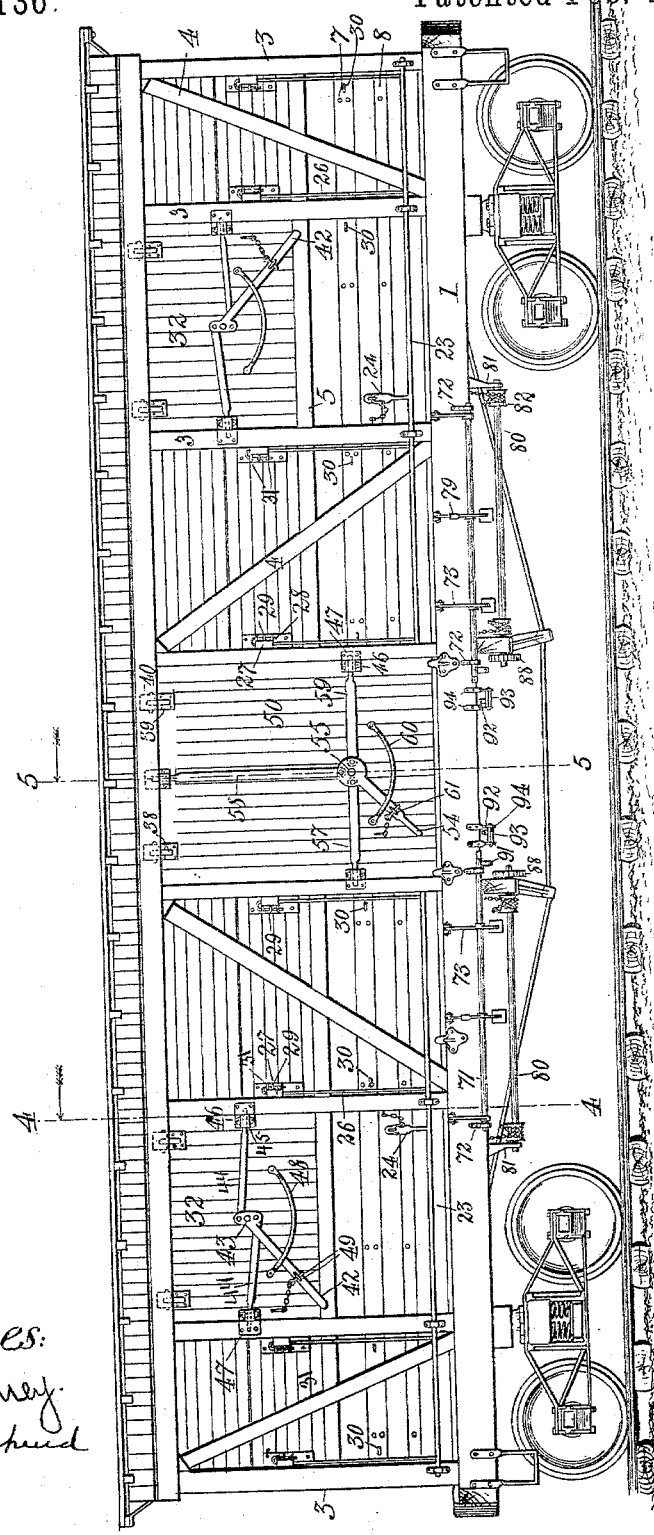
Figure 2:
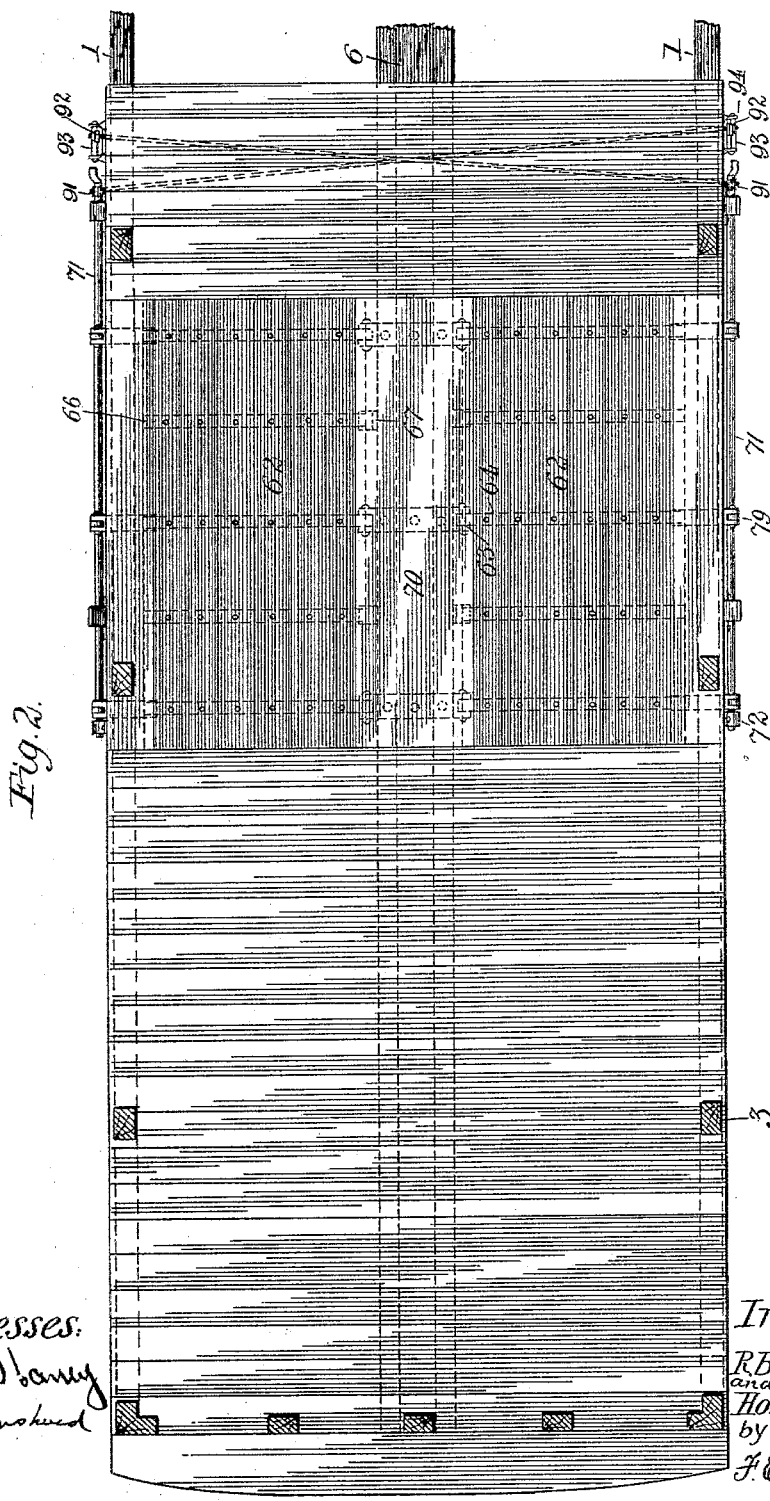
Figure 3:
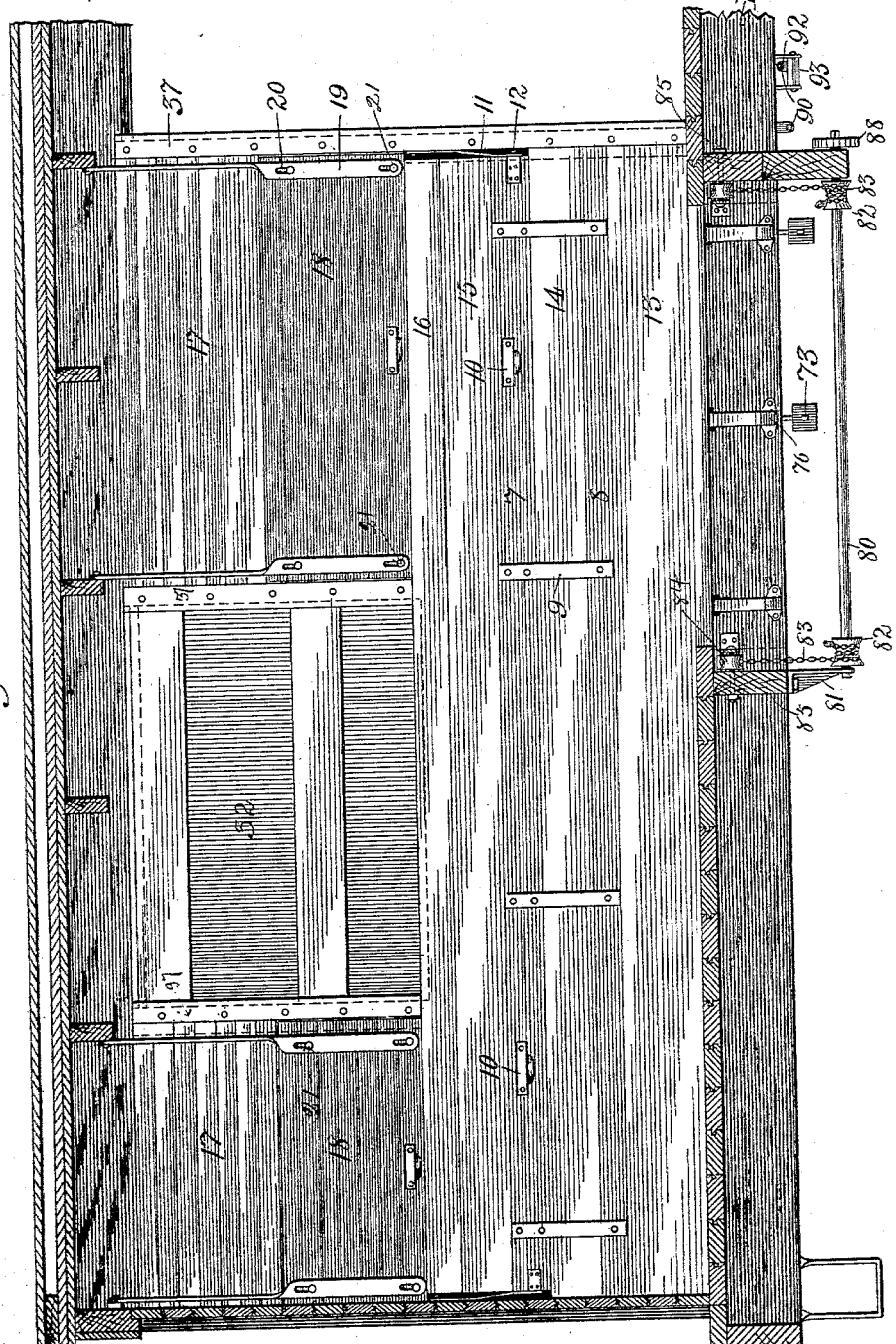
Figure 4:
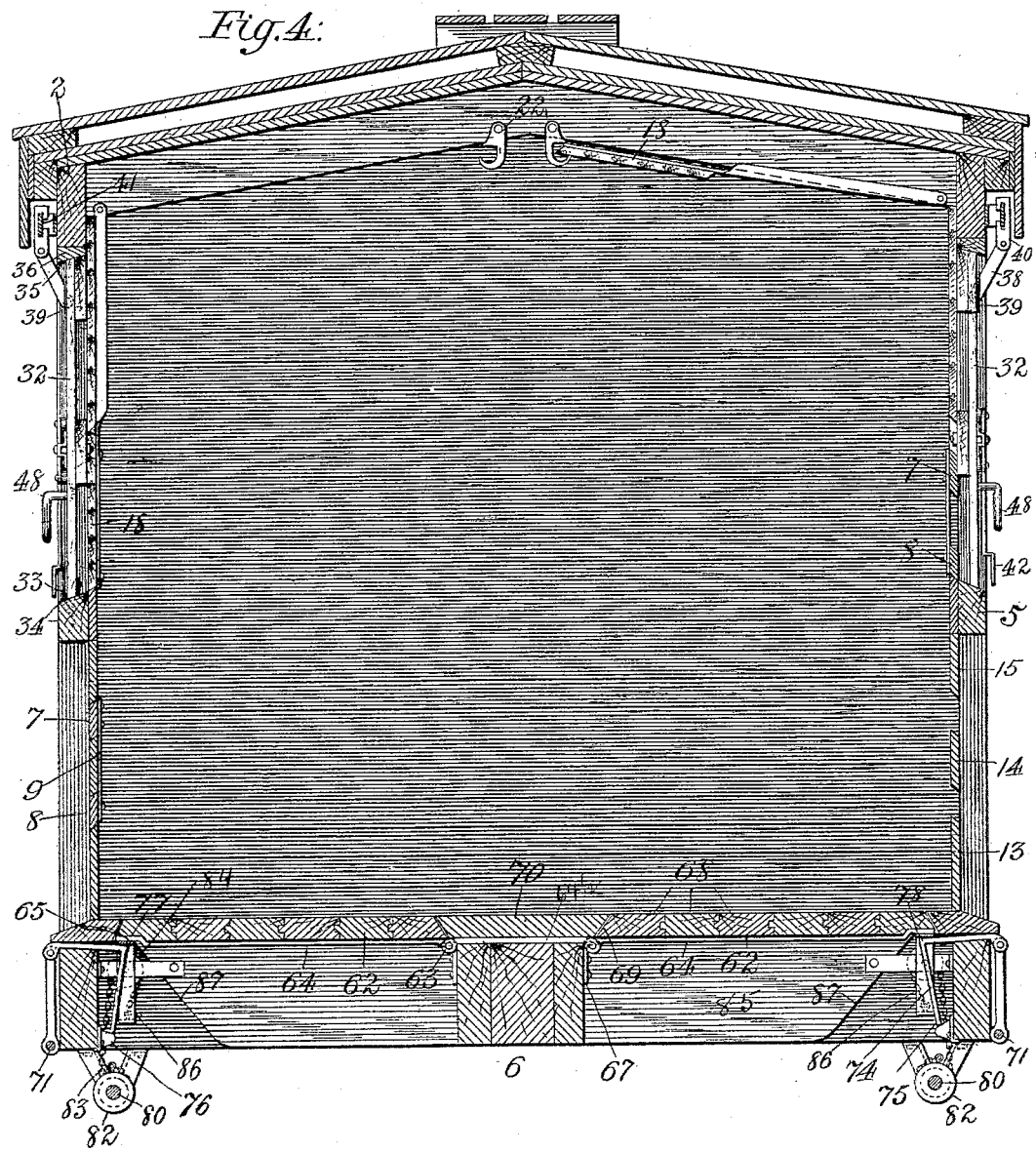
Figure 5:
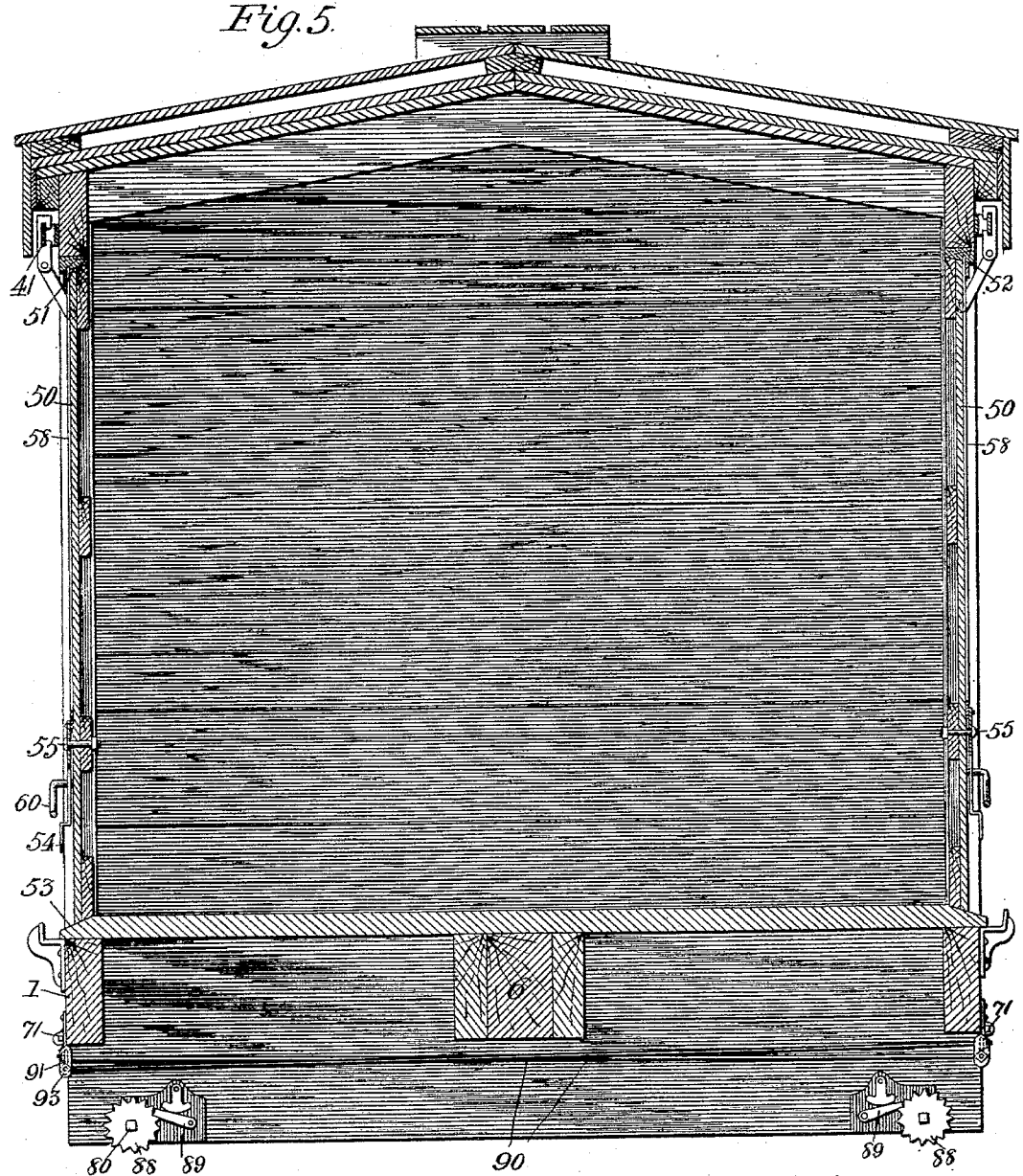

Figure 1 is a view in elevation of the entire car; Fig. 2, a plan view of one-half of the floor, showing the location of two drop-doors; Fig. 3, a view in elevation of a part of the car as seen from the inside; Fig. 4, a cross-section taken on line 4 4 of Fig. 1; Fig. 5, a cross-sectional view taken on line 5 5 of Fig. 1; Fig. 6, a view of the lever-arm for operating the sliding bars on the main door; Fig. 7, a view of the bearing for the lever; Fig. 8, a view of one of the sliding bars; Fig. 9, a view of the locking device for one of the drop-doors, Fig. 10, a detail view of the means employed for fastening one of the movable sections or an adjustable side in position; Fig. 11, a view of a slide-casting for supporting a door; Fig. 12, a casting set in the door; Fig. 13, one of the links attached to a slide-casting and to one of the castings set in the door; Fig. 14, one of the castings attached to a door for guiding a sliding bar; and Fig. 15, a preferred form of joint for the adjustable sides, movable sections, and lining-strips.

The numeral 1 designates the sills; 2, the plates; 3, the perpendicular posts uniting the sills and the plates; 4, the braces extending between the sills and plates; 5, the belt-rails; 6, the central stringers, consisting either of a single longitudinal timber or also composite or compound; 7 and 8, panels spaced apart and united by straps 9 to constitute an adjustable side. Both panels of the side have their edges beveled to match the beveled edges of lining-strips 13 14 15 16, as shown in Fig. 4. The upper panel 7 is provided with handholds 10 and castings having pintles 12 for the attachment of hangers 11, which are pivoted, as shown in Fig. 3, to the side of the car and to a perpendicular post.

17 17 are permanent linings located adjacent to the plate and fastened to the posts; 18 18, movable sections having their top and bottom edges beveled to match corresponding bevels on strip 16 and permanent linings 17.

Twisted hangers 19, provided with slots 20 and having their upper ends pivoted to the carlines, support the movable sections 18 through the medium of headed pins 21, adapted to move in the slots 20. These sections can be swung through the arc of a circle to the roof and held in an elevated position by hooks 22, pivoted to the carlines. An adjustable side can also be swung from the position it occupies in Fig. 3 upwardly to the position shown at the right in Fig. 4, the beveled edge of panel 8 fitting the beveled edge of strip 16. A fastening device for securely holding the adjustable side in place in its raised position and the movable sections when in their lowered positions is illustrated in Figs. 1 and 10.

23 is a rod journaled in bearings attached to the posts, and 24 a lever-arm attached to rod 23 and provided with locking means, as shown.

25 are arms secured to rod 23 and pivoted to sliding bars 26, bent at the ends to form locking-bolts. The bars are guided in castings 27, attached to the posts, and have staples 31 integral therewith.

The movable sections and adjustable sides are provided with staples 29 and 30, which register with the staples 31 of the guide-castings and admit the passage of the bolts 28 of the sliding bars.

In Fig. 15 we show panel 8 and strip 13, beveled to form an ogee joint, which more effectually excludes rain and sifting snow or dust. The movable sections are preferably provided with this style of bevel, the length of the joint corresponding to the location and conditions necessary to secure proper adjustability of the side and section.

Each side of the car has adjustable sliding outside doors 32, supported by links 38, which are pivoted at their upper ends to slide-castings 40, fitting over a longitudinal guide-rail 41, and at their lower ends to a casting 39, having lugs 100, set in the body of the door. The lower edge of each door is beveled at 33 to fit the upper beveled edge of the belt-rail 34, and the top edge likewise beveled at 35 to fit the beveled edge of a cap-piece 36. Metal cleats 37 are attached to the perpendicular posts on the inside and project far enough over the door-opening to serve as stops for the edges of the door. The fastening device for the door consists of lever 42, pivoted at 43 and operating sliding bars 44, having their ends beveled at 45 and moving within guide-castings 46. Sockets 47 are provided on the posts to receive the beveled ends of the bars 44. The levers 42 may be guided by rods 48, attached to the door, as shown, and secured in position by a staple and pin 49.

The doors at the center of the sides of the car are suspended from the rail 41 by links 38 and castings 39 40. These doors are beveled at the top at 51 to fit and match beveled caps 52 and are also beveled along the lower edges to fit the beveled ends 53 of the flooring-strips. The fastening device in this case consists of the lever-arm 54, fitting over a bearing 56 and secured to the door by a pivot-bolt 55. Sliding bars 57 58 59 are pivoted to the lever-arm, as shown, and are guided in castings 46 on the door, the beveled ends engaging sockets 47, attached to the posts and plate. A guide-rod 60 and a staple and pin 61 are provided of a construction similar to those used on the small side doors.

In the floor, on each side of the main doorway, are located four drop-doors 62, two of which are shown in Fig. 2.

64 are the straps of the hinges, pivoted to bars 64½, extending over the top of the stringers, by pins 63. The ends of the straps are bent up at 65, as shown.

66 are straps secured to the doors and engaging clips 67 when the doors are closed, so as to take the weight of the load and relieve the pivot-pins 63 from undue strains. The longitudinal edges of strips 68 of the drop-doors are beveled at 69 to fit and match the beveled edges of the longitudinal permanent flooring-strips 70 and 70½. The fastening means for each drop-door consists of a rod 71, pivoted in bearings 72, carrying weighted arms 73, having bent straps 74 passing over the top of the sill, as shown, and with the ends 75 supported on castings 76. The angular parts 78 of the straps 74, pivoted to the weighted arms 73, engage the under side of the strap 77, attached to the edge of the door and seated against the ends of the straps 64. A weighted arm may be provided with a socket 79, adapted to receive the end of an operating-lever.

The means for closing a drop-door consists of a shaft 80, turning in bearings 81, having drums 82 and chains 83. One end of each chain is attached to a drum, then passes over a sheave 84 on the cross-frame tie-timber 85, and has its other end secured to the end of a projecting arm 86 on the door. The cross-frame tie-timbers 85 are cut away at 87, as illustrated, to receive the sheaves. Shaft 80 at the end where it passes through a tie-timber carries a ratchet 88 and is engaged by a pawl 89, pivoted to the tie-timber. To allow the doors on both sides to be dropped from either side, cross-rods 90 90 are each attached at one end to arms 91 91 on rods 71 71 and at the other ends to arms 92 92 on short rectangular shafts 93 93, turning in bearings 94 94. Each shaft 93 is adapted to receive and to be operated by the same wrench which fits the rectangular end of rod 71.

Supposing the car to be closed and in the form of a practically air-tight box-car, as shown in Figs. 1 and 3, and it is desired to transform it into a ventilated car with partly open sides adapted for the transportation of fruit, green lumber, &c., the lever 24 is revolved through the arc of a circle, raising the bolts 28 out of engagement with staples 29. The movable sections are next disengaged from the beveled lining-strip 16 and swung up and attached adjacent to the roof of the car by the pivoted hooks 22. Then an adjustable side is raised out of engagement with the beveled edges of strips 13 14 15, where it is normally held by gravity and swung through the arc of a half-circle to a position above the belt-rail and with the beveled edge of panel 8 fitting the beveled edge of strip 16. The lever 24 is finally revolved and throws the bolts 28 down through the staples 30, which register with the staples 31 on the castings.

To re-transform the car to a closed box again, a reverse order of procedure is followed. If it is desired to load the car with coal, coke, or similar material, the lever 42 is unfastened and thrown to the right under the guide-rod 48 till the sliding bars 44 are withdrawn from the sockets 47. The door then by gravity slides down the beveled edge of the belt-rail to a position beyond the plane of the car-wall and can be moved away from the opening, sliding on the guide-rail 41. When loaded, the door itself is returned to a position in front of the opening and then by pressure forced up the bevel on the belt-rail. The lever being moved to the left the beveled points 45 of the sliding bars engage the sockets 47 and force the door still closer against the cleats 37 37.

To dump the load of coal, coke, or other material, the pawls 89 are thrown off the ratchet-wheels 88. Then a wrench is applied to the ends of the shafts 71 and 93 and the same revolved, drawing forward the weights on the arms and retracting the straps 74 from beneath the straps 77. The weight of the doors causes them to fall, at the same time unwinding the chains from the drums.

To close a door, a wrench is applied to the end of the rod 80 and the same revolved, winding up the chains on the drums 82 and bringing the edge of the door in contact with the straps 74, forcing them back and raising the door to a horizontal position, when the weights on the arms will force the angular parts of the straps 78 under the strap 77. The pawl is then thrown over and the door doubly locked.

Minor details of the construction of certain parts worthy of note are the following: The slide-castings 40, as shown in Fig. 11, have the edges which engage the guide-rail curved. The castings 39 (shown in Fig. 12) are set into the body of the door and are provided with lugs 100. The sliding bars shown in Fig. 8 have their ends beveled, and the cleats 37, attached to the posts of the main doorway, extend from the plate to the floor. The beveled edges of the adjustable sides, movable sections, and lining-strips likewise constitute an important feature of the invention, inasmuch as their use results in the formation of practically air-tight joints.

A car constructed as hereinbefore described is adapted for the transportation of many different classes of merchandise, one class in one direction and another class in an opposite direction, thus effecting a great saving by obviating the necessity of hauling rolling-stock empty in one direction.

While we have specifically described and illustrated but one mode of the practical embodiment of our invention to obtain the objects enumerated and to adapt a car for the transportation of different classes of freight, we do not limit ourselves to the one mode as pictured on the drawings, as other modes may embody our improvements. Changes in details of construction and in the form and location of certain parts may also be made and equivalent elements substituted for those shown without passing outside the limits of our invention.

What we claim as new, and desire to secure by Letters Patent, is—

1. The combination with a flush car-door supported by castings and links 38 pivoted to the said castings at each end, of the locking means consisting of a lever pivoted at one end to the door; sliding bars pivoted to the lever; guide-castings secured to the door and through which the bars slide; sockets located on the body of the car adjacent the opening for the door; and means for holding the lever in a locked position; the ends of the said sliding bars being beveled, as at 45, whereby after the extreme ends of the bars have engaged the sockets a further rotation of the lever will force the door to a practically air-tight position against the edges of the door-opening; substantially as described.

2. The combination with the beveled belt-rail, of posts 3 having cleats; a door supported by hangers from a rail and adapted to rest on the bevel of the belt-rail and against the cleats; and fastening means for holding the door flush; in substance as set forth.

3. The combination with a car-door of a supporting-rail; the slide-castings 40; the castings 39 set in the body of the door and substantially flush; the links 38; and means for securing the door flush with the car side consisting of the pivoted lever, the sliding bars and the guides and sockets; substantially as described.

4. A car having doors in the sides above the belt-rails, movable sections, adjustable sides, and drop-doors in the floor; in substance as set forth, whereby the car can be transformed into a close box, ventilated, or dumping car.

5. A car having the adjustable sides made up of the panels and supported by hangers; said panels being beveled to match the permanent beveled lining-strips; and centrally-located movable doors for closing openings between the belt-rails and plates; as set forth.

6. The combination with a movable section and adjustable side of the fastening means consisting of a rod 23, arms 25, bars 26, guides for the bars, bolts on the bars for engaging staples on the section and adjustable side, and means for revolving the rod 23; in substance as set forth.

7. A car having at each side of the main door two movable sections, a door between the same adjacent the belt-rail, and an adjustable side; substantially as described.

8. A car having doors in the sides above the belt-rails, movable sections, adjustable sides, and drop-doors in the floor; in substance as set forth.

9. A drop-door having hinges, and means for securing it in a closed position consisting of the rod 71, weighted arms 73, straps 74, and a ledge 76 for the end of the strap; as set forth.

10. The fastening means for the drop-door, consisting of the rod, weighted arms, straps bent and passing over the side sill and engaging the edge of the door, and supports for the ends of the straps; in substance as described.

11. The drop-door for a car having straps 66 supplemental to the hinges, and castings 67 engaged by the ends of the straps when the door is closed, to take the weight of the load and relieve the hinges; as set forth.

12. The means for closing the drop-door consisting of the rod 80 having drums, said rod arranged parallel with the side sill and turning in bearings secured thereto, the chains, sheaves for the chains, and arms on the door for the attachment of the ends of the chains; in substance as set forth.

13. A car having side sills, a central longitudinal sill, drop-doors hinged to the central sill, and each drop-door provided with means for closing it flush with the main floor and locking it in position; and supplemental locking means, engaging the edge of the door for doubly securing it; in substance as set forth.

14. The locking means for the two drop-doors in combination with the rod 90, shaft 93, and rod 71, whereby each of the doors can be dropped from one side of the car, in substance as described.

15. A car-door having a beveled lower edge and suspended from a rail by slide-castings 40, links, and castings 39, set in the body of the door in such a manner that its weight will support it outside the wall of the car when released; and said door provided with fastening means embracing sliding bars beveled at the ends and engaging sockets, so that the door can be forced to a flush position and thus render the car practically air-tight.

16. A car having doors, adjustable sides, movable sections, and lining-strips; the edges of the said sides, sections, and strips being beveled to form ogee joints, so as to effectually exclude rain, sifting snow and dust and insure the constitution of a practically air-tight car; in substance as set forth.

17. The combination in a convertible open and closed box-car having centrally-located main doors 50, 50, of trap-doors 62 in the floor, one each side of each main door and hinged to a central stringer 6 and closing flush with the permanent floor; and doors 32 in the sides of the car between the belt-rails 5 and the plates 2 and in a position midway between the main doors and the ends of the car; said doors 32 in the sides being adapted for loading coal or coke, and said trap-doors 62 being adapted for dumping the same beneath the car without the necessity of excessive shoveling of the load; in substance as set forth.

18. The arm 73 of the drop-door-fastening means provided with the socket 79; as set forth.

19. The combination with the side sills 1, 1, of the central stringer extending from end to end of the car; the cross-frame tie-timbers 85 located between the sills and central stringer; the drop-doors 62, one each side of the central stringer and supported by hinges, said doors closing flush; and means for closing the doors consisting of the ratchet-and-pawl mechanism, shaft 80, chains, and sheaves 84 supported on the cross-frame tie-timbers; substantially as set forth.

20. The combination in a car of the sills; the central stringer; the cross-frame tie-timbers; and the drop-doors hinged to the central stringer; said cross-frame tie-timbers being cut away at 87 to receive the sheaves of the door-closing mechanism; in substance as set forth.

In testimony whereof we affix our signatures in presence of two witnesses.

ROBERT B. CAMPBELL.
HOWARD CARLTON.

Witnesses:
FELIX R. SULLIVAN,
A. T. BENZINGER.